United States Patent [19]

Martinez

[11] Patent Number: 4,712,623

[45] Date of Patent: Dec. 15, 1987

[54] TURF PLUG PUSHER

[76] Inventor: Donald G. Martinez, P.O. Box 584, Calistoga, Calif. 94515

[21] Appl. No.: 840,623

[22] Filed: Mar. 17, 1986

[51] Int. Cl.$^4$ .................. A01B 45/00; E02F 3/815
[52] U.S. Cl. .................. 172/817; 172/701.1; 404/118; 404/119; 37/266; 37/281; 56/16.9
[58] Field of Search .................. 172/701.1, 701.3, 815, 172/811, 817, 684.5, 832; 404/118, 119, 101, 96; 56/16.9, 2; 37/118 A, 281, 243, 279, 266, 274, 275

[56] References Cited

U.S. PATENT DOCUMENTS

| 957,357 | 5/1910 | Lyon | 172/393 |
|---|---|---|---|
| 1,406,325 | 2/1922 | Anderson | 172/701.1 |
| 1,739,022 | 12/1929 | Wallick | 172/684.5 |
| 1,856,148 | 3/1932 | Ball | 172/701.3 |
| 1,894,410 | 1/1933 | Mattice | 172/701.1 |
| 2,455,160 | 11/1948 | Burrow | 37/118 A X |
| 2,573,921 | 11/1951 | McNamara | 172/815 |
| 3,182,410 | 5/1965 | Schiavi | 404/96 |
| 3,548,956 | 12/1970 | Hochstetler | 172/817 |
| 3,559,543 | 2/1971 | Schwoebel | 404/118 |
| 3,797,578 | 3/1974 | Velasquez | 172/22 |
| 3,800,447 | 4/1974 | Harvey | 172/817 |
| 3,800,882 | 4/1974 | Werts et al. | 172/817 |
| 3,881,261 | 5/1975 | Lavoie | 37/46 |
| 3,898,753 | 12/1975 | Kinnunen | 37/46 |
| 4,496,265 | 1/1985 | Fragale | 404/118 |
| 4,570,366 | 2/1986 | Yost | 172/701.1 |

Primary Examiner—Richard J. Johnson
Attorney, Agent, or Firm—Townsend and Townsend

[57] ABSTRACT

A plug pusher, mounted to a mower of the type having a lift frame, pushes turf core plugs from an aerated turf surface. The plug pusher includes two L-shaped, elongate pusher elements, each having a horizontal first leg and a vertical second leg, mounted to the vehicle for being raised and lowered by the lift frame. The first leg of each pusher element extends forwardly from the second leg and lies on the turf surface so as the vehicle moves the core plugs gather in front of the second leg and on top of the first leg. The pusher elements are configured and are mounted to the mower to permit limited movement relative to the mower and each other to accommodate uneven surfaces.

26 Claims, 9 Drawing Figures

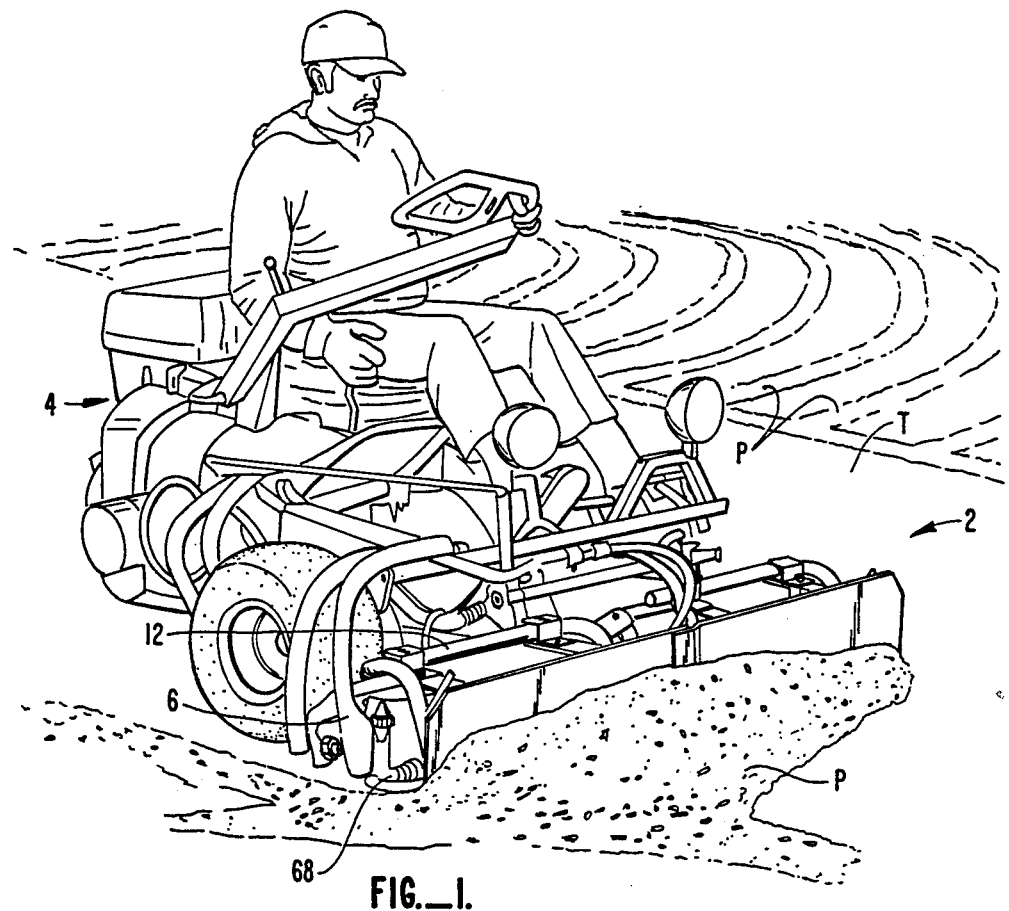
FIG._1.
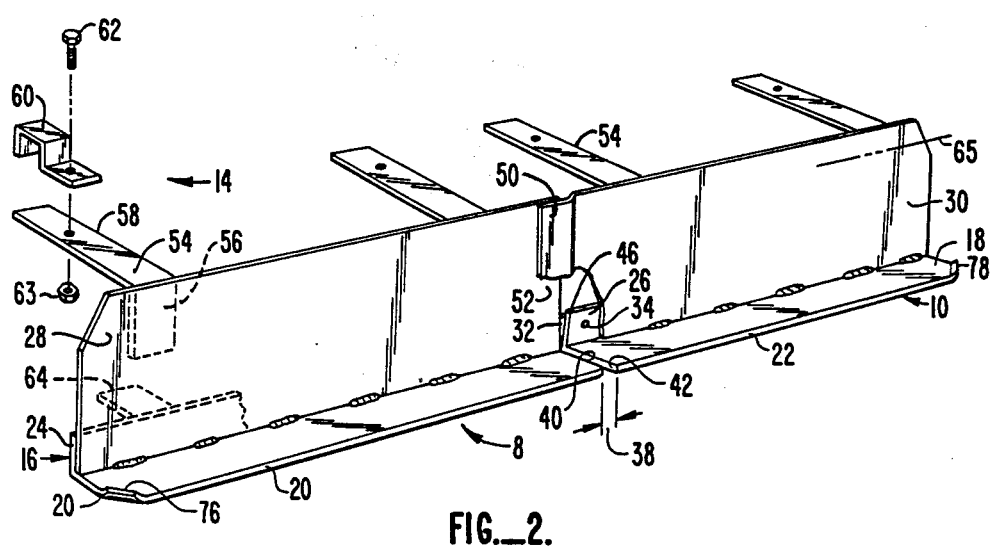
FIG._2.

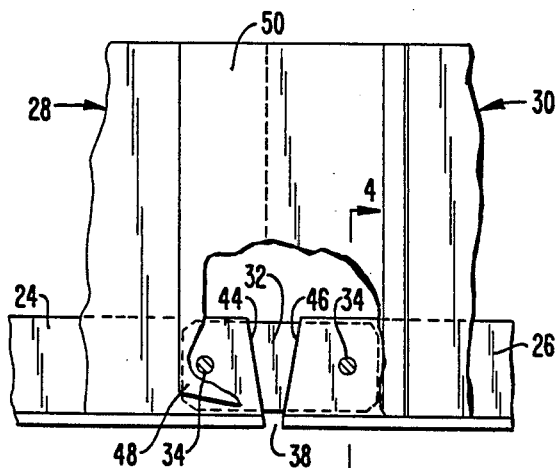
FIG._3.
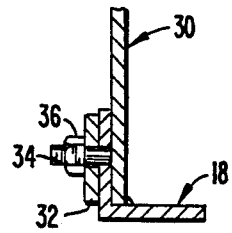
FIG._4.
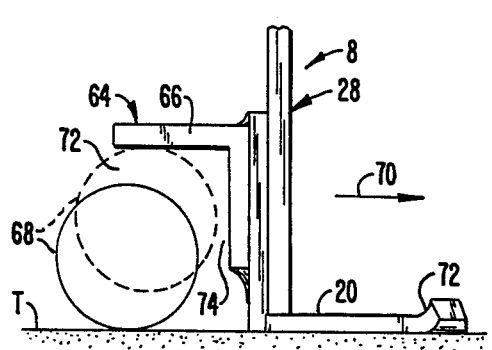
FIG._5A.
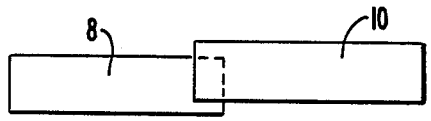
FIG._6A.
FIG._6B.
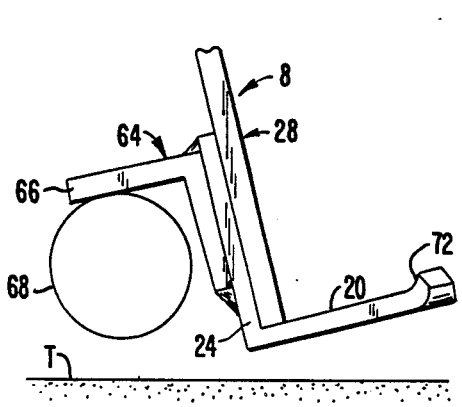
FIG._5B.
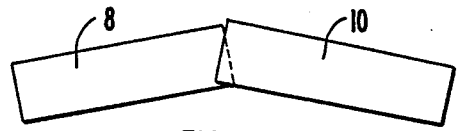
FIG._6C

TURF PLUG PUSHER

BACKGROUND OF THE INVENTION

Well groomed turf, such as golf course greens, must be renovated periodically. One step in the renovation is the aeration of the green by the removal of core plugs. Core plugs are cylindrical plugs of the turf and underlying soil removed by a special aeration machine. The aeration machine leaves the core plugs on the surface of the turf for later removal by a worker.

Core plug removal is commonly done by hand. Workers, using long handled pushers, remove the plugs by pushing them off the edge of the green. Later the piles of core plug surrounding the green are scooped up. To clear a 7,000 square foot green, it takes about four or five workers 25 to 30 minutes. It is, besides time consuming, a very tiring task for the workers.

SUMMARY OF THE INVENTION

The present invention is directed to a plug pusher used to push aeration core plugs from an area of turf, typically a golf course green. The plug pusher is mounted to a vehicle, such as a mower unit. Preferably the vehicle is of the type having a operator actuated lift frame movable between raised and lowered positions so the plug pusher can be raised and lowered by the operator actuating the lift frame.

The plug pusher includes at least one elongate pusher element having a forwardly extending first portion and upwardly extending second portion. The pusher element is mounted to the vehicle so that the first portion is generally adjacent and parallel to the turf surface; as the vehicle moves over the turf surface, the core plugs gather in front of the second portion and on top of the first portion.

The pusher element is mounted to the vehicle so that limited movement in a vertical plane, both rectilinear and twisting movement, can occur to accommodate uneven surfaces. When two or more pusher elements are used, they are mounted to the vehicle so to be generally longitudinally aligned. The adjacent ends of the pusher elements are confined to permit limited vertical movement relative to one another while not permitting turf core plugs to leak past the joints.

One of the primary advantages of the invention is that it drastically reduces the total time required to remove the core plugs from a green or other turf surface. A single person using the invention can clear a green in the time it previously took four or five persons to do it. The apparatus is relatively simple and can be mounted easily and quickly to existing mower units having front lift frames. It is thus a very cost effective alternative to cleaning the green by hand. It also solves the problem of worker fatigue since the operator rides the mower unit. The operator can therefore work steadily all day removing core plugs.

The invention accommodates uneven surface by virtue of its movable, articulated mounting to the vehicle. The articulating feature, as well as other features such as the upturned corners of the first portions of the pusher elements, keeps the plug pusher from damaging the turf surface.

A primary feature of the invention is the use of a pusher element including a forwardly extending first portion, or leg, and an upwardly extending second portion, or leg. The use of the generally horizontal first leg allows the pusher element to rest on the turf surface with the weight of the pusher element distributed over a relatively large surface to help prevent damage to the turf. Also, since the core plugs rest on the generally horizontally extending first leg, the plug pusher is self-loading. That is, the more plugs which the pusher elements push, the more weight is exerted on the first leg. This tends to eliminate any propensity of the plug pusher to ride up on a pile of plugs in front of it.

Other features and advantages of the present invention will appear from the following description in which the preferred embodiment has been set forth in detail in conjunction with the accompanying drawings.

BRIEF DESCRIPTION OF THE DRAWINGS

FIG. 1 is a perspective view showing a turf plug pusher made according to the invention mounted to a mower unit.

FIG. 2 is an isometric view of the plug pusher of FIG. 1.

FIG. 3 is a partial front view of the plug pusher of FIG. 2 with portions broken away for clarity.

FIG. 4 is a cross-sectional view taken along line 4—4 of FIG. 3.

FIGS. 5A and 5B are simplified end views of the the plug pusher of FIG. 1 with the front, lift roller of the mower unit in its lowered and raised positions respectively.

FIG. 6A is an exaggerated schematic representation showing relative vertical rectilinear movement of the pusher elements which enables the pusher to push plugs on stepped turf surfaces.

FIGS. 6B and 6C are exaggerated schematic representations illustrating the vertical pivotal movement of the pusher elements as the plug pusher moves over depressions and mounds respectively.

DETAILED DESCRIPTION OF THE PREFERRED EMBODIMENT

Referring now to FIGS. 1 and 2, plug pusher 2 is shown mounted to a riding turf mower 4 of the type having a lift frame 6. Plug pusher 2 includes first and second pusher elements 8, 10 mounted to a support bar 12 of the vehicle by pairs of support bracket assemblies 14. In the preferred embodiment bar 12 is a part of lift frame 6; lift frame 6 pivots about support bar 12.

First and second pusher elements 8, 10 include first and second shoes 16, 18. Shoes 16, 18 are L-shaped members including horizontal members 20, 22 and vertical members 24, 26. Face plates 28, 30 are welded to vertical members 24, 26. Horizontal members 20, 22 constitute the first legs while face plates 28, 30 and vertical members 24, 26 make up the second legs of the first and second pusher elements 8, 10.

Pusher elements 8, 10 are secured to one another by a link 32 (see FIGS. 3 and 4) secured to studs 34 which extend from vertical members 24, 26. Link 32 is maintained on studs 34 by nuts 36.

Several features combine to permit the relative movement of first and second pusher elements 8, 10 in a plane generally parallel to face plates 28, 30, the plate being a generally vertical plane oriented perpendicular to the vehicle axis. Link 32 is sized so that a gap 38, approximately ¼ inch, is maintained between opposed edges 40, 42 of horizontal members 20, 22. Opposed edges 44, 46, see FIG. 3, of vertical members 24, 26 are cut at an angle to form a wedge shape cutout. A corner 48 of face plate 30 is chamfered. A region 50 of face plate 30 is offset and overlaps a part 52 of face plate 28. Gap 38 is small enough so that core plugs P cannot pass through the gap and yet large enough to permit the pusher elements 8, 10 to shift in a vertical, rectilinear fashion, shown in FIG. 6A, or to pivot when following either a concave curvature, FIG. 6B, or a convex curvature, FIG. 6C. Such ability of pusher elements 8, 10 to shift relative to one another is especially useful when adjacent turf surfaces, such as a green and its adjacent apron, are stepped, that is at different heights.

Support bracket assemblies 14 each include an L-shaped mounting bar 54 having a vertical leg 56 welded to face plate 28 or 30 and a horizontal leg 58 extending beneath support bar 12. A clamping bracket 60 is secured to horizontal leg 58 by a nut and bolt 62, 63 to capture support bar 12 between bracket 60 and horizontal leg 58. The fit, however, is somewhat loose to permit the desired amount of pivotal and rectilinear movement of pusher elements 8, 10 in a vertical plane. If desired the fit of support bar 12 to mounting bar 54 and of line 32 on studs 34 can be sufficiently loose to permit pusher elements 8, 10 to twist in unison or independently about a horizontal, transversely extending axis 65. The position of axis 65 in FIG. 2 is for illustration purposes only since actual movement is apt to be a complex combination of movements. The various types of movement of pusher elements 8, 10 are collectively termed articulation.

A lift plate 64, see FIGS. 5A and 5B, is secured to each vertical member 24, 26 and has a generally horizontal portion 66 overlying the front, lift roller 68 of the lift frame. As seen in FIG. 5A, during normal operation, lift roller 68 rolls along turf surface T while first legs 20, 22 slide along turf surface T in the direction of arrow 70. It should be noted that there are gaps 72, 74 between rollers 68 and pusher elements 8, 10 so that during normal operation roller 68 does not rub against either of the pusher elements. To help keep pusher elements 8, 10 from digging into turf surface T, especially when turning, the outer corners 76, 78 of horizontal members 20, 22 are both chamfered and turned up slightly. Also, it is preferred that edges of first legs 20, 22 be ground round to help prevent damage to turf surface T. In moving between its lowered position of FIG. 5A and its raised position of FIG. 5B, roller 68 contacts horizontal members 66 to raise pusher elements 8, 10.

In use, the user places first and second pusher elements 8, 10 adjacent the front end of turf mower 4 with lift plates 64 above roller 68 and horizontal legs 58 of mounting bars 54 below support bar 12. Clamping brackets 60 are then mounted over support bar 12 and secured to leg 58. Starting on one side of turf surface T, the user lowers lift frame 6 and plug pusher 2 therewith and pushes core plugs P to the opposite side of turf surface T and off of the edge of the turf surface. The weight of core plugs P on horizontal members 20, 22 helps keep pusher elements 8, 10 from riding up on the pile of core plugs which builds up in front of the pusher elements. The process is repeated until all core plugs P are removed from surface T. Core plugs P are then scooped up or otherwise gathered in a conventional fashion.

In the preferred embodiment, support bar 12 is a part of lift frame 6 and lift frame 6 pivots about support bar 12. Therefore plug pusher 2 pivots about support bar 12. If desired, the lifting movement applied to the plug pusher 2 could be rectilinear rather than arcuate. First and second pusher elements 8, 10 are shown as L-shaped members having generally flat legs. Pusher elements 8, 10 may be other shapes as well. For example, the upper surfaces of horizontal members 20, 22 could be arcuate or tapered while the lower surfaces remain flat. Although two pusher elements are shown, a greater or lesser number could be used as well. The invention has been shown mounted to a convention mower 4. It could be mounted to other vehicles or could be a part of a specially designed plug pusher vehicle.

Other modification and variation can be made to the disclosed embodiment without departing from the subject of the invention as defined in the following claims.

I claim:

1. A turf plug pusher for use with a vehicle to push aeration core plugs from a turf surface without damage to the turf surface comprising:
   an elongate pusher element including a skid and barrier means;
   the skid having a leading edge and a generally flat, horizontal turf engaging lower surface;
   the pusher element being mounted to the vehicle so that the lower surface can rest on the turf surface during use;
   the barrier means extending upwardly from the skid and including means for gathering core plugs on top of and in front of the skid as the pusher element moves in a forward direction over the turf surface so that the pusher element is self loading with the weight of core plugs tending to keep the lower surface of the skid plate against the turf surface.

2. The plug pusher of claim 20 wherein the elongate pusher element is L-shaped

3. The plug pusher of claim 2 wherein the skid has a forward corner, the forward corner being chamfered and upturned so as not to dig into the turf surface.

4. The plug pusher of claim 1 further comprising means for articulatingly mounting the pusher element to the vehicle to permit the pusher element to follow the turf surface when the turf surface is uneven.

5. The plug pusher of claim 4 wherein the articulatingly mounting means mounts the pusher element for vertical movement in a generally vertical plane.

6. The plug pusher of claim 4 wherein the articulatingly mounting means mounts the pusher element for rectilinear vertical movement, for tilting movement about a transversely extending, generally horizontal axis and for twisting movement in a transversely extending, generally vertical plane.

7. The plug pusher of claim 1 wherein the pusher element includes first and second generally longitudinally aligned pusher elements.

8. The plug pusher of claim 7 wherein:
   the barrier means of the first and second pusher elements are connected by an articulation link;
   the skids have opposed edges spaced apart a short distance from one another; and
   the barrier means of the second pusher element includes an offset region overlapping a part of the barrier means of the first pusher element, whereby the first and second pusher elements can move in a generally vertical plane relative to one another to allow each said first and second pusher elements to move according to the contour of the turf surface.

9. A plug pusher vehicle for pushing aeration core plugs from a turf surface comprising:
   a vehicle frame;

a lift assembly mounted to the vehicle frame and including a lift element movable between a raised position and a lowered position;

first and second elongate, generally longitudinally aligned, L-shaped pusher elements, each including a first, forwardly extending portion and a second, upwardly extending portion;

link means for articulatingly connecting the first and second pusher elements to permit the first and second pusher element to move relative to one another in a generally vertical plane;

means for mounting the first and second pusher elements to the vehicle for movement between an up position and a down position; and a lift frame engagement element for engaging the lift frame as the lift frame moves between its raised and lowered positions so the first and second pusher elements move therewith between their up and down positions.

10. The plug pusher of claim 9 wherein the first portions each have opposed, spaced apart inner edges.

11. The plug pusher of claim 9 wherein the second portion of the second pusher element has an offset region which overlaps a part of the first pusher element second portion.

12. The plug pusher of claim 9 wherein the first and second pusher elements each include a face plate and an L-shaped shoe, the shoe including a first shoe part constituting the first portion and a second shoe part to which the face plate is mounted.

13. The plug pusher of claim 12 wherein the first parts have opposed, spaced apart, parallel first edges and the second parts have opposed, spaced apart, upwardly diverging second edges.

14. The plug pusher of claim 13 wherein the face plate of the second pusher element has an offset region overlapping a part of the face plate of the first pusher element.

15. A plug pusher for pushing aeration core plugs from a turf surface, the plug pusher for use with a mower unit of the type having a lift assembly including a lift frame having a front roller movable between a raised position and a lowered position, the plug pusher comprising:

first and second elongate, longitudinally aligned, L-shaped pusher elements, each including a generally horizontal, forward extending first leg and a generally vertical second leg;

the first and second pusher elements having inner edges configured for movement relative to one another in a generally vertical plane extending generally parallel to the second legs;

link means for articulatingly connecting the first and second pusher elements;

means for mounting said first and second pusher elements to the mower unit for movement between up and down positions, the second legs being forward of the front roller; and a lift element mounted to at least one of the pusher elements and positioned above the front roller, the second legs and the lift element being spaced apart from the front roller when the front roller is in the lowered position and the pusher elements are in the down positions, the lift element positioned to contact the front roller as the front roller is raised from the lowered position to the raised position so that the pusher elements are raised from the down positions to the up positions.

16. The plug pusher of claim 9 wherein the vehicle includes ground engaging drive members and wherein the mounting means mounts the first and second pusher elements to the vehicle forward of the ground engaging drive members.

17. The plug pusher of claim 16 wherein the ground engaging drive members are wheels.

18. A nondestructive method for removing material lying on top of a turf surface without damage to the turf surface, comprising the following steps:

mounting an elongate pusher element to a vehicle, the pusher element having a horizontal skid and material barrier means, the barrier means extending upwardly from the skid;

resting the horizontal lower surface of the skid on the turf surface, the lower surface of the skid configured to keep from damaging the turf surface, the skid having a leading edge, at least a portion of the barrier means spaced apart from the leading edge to create a forwardly opening material collection region above the skid and in front of the barrier means; and moving the pusher element over the turf surface in a forward direction with the leading edge leading so that at least a portion of the material gathers in the material collection region to aid keeping the pusher element against the turf surface.

19. The method of claim 18 wherein the resting step is carried out using a pusher element having an L cross-sectional shape.

20. The method of claim 18 further comprising the step of lowering and raising the pusher element before and after the moving step respectively.

21. The method of claim 20 wherein the lowering and raising step includes the step of lowering and raising a roller, the roller engaging the pusher element.

22. The method of claim 18 wherein the mounting step includes the step of articulatingly connecting at least two of the pusher elements to one another to help the pusher elements follow the turf surface.

23. The method of claim 18 wherein the resting step is carried out using a pusher element having a substantially flat lower surface.

24. A nondestructive method for cleaning aeration core plugs from a turf surface comprising the following steps:

mounting an elongate pusher element to a vehicle, each pusher element including a leading edge and first and second surfaces, the first and second surfaces positioned rearwardly of the leading edge, the first surface defining a downwardly facing lower surface adapted to slide over the turf surface without damaging the turf surface, the second surface including a portion extending upwardly away from the lower surface;

lowering the pusher element until the lower surface rests on and is supported by the turf surface;

moving the vehicle over the turf surface in a forward direction so the leading edge leads to gather the core plugs over the first surface and in front of the pusher element the weight of the core plugs on the second surface portion tending to keep the lower surface touching the turf surface; and raising the pusher element.

25. The method of claim 24 wherein the mounting step is carried out by mounting a plurality of the pusher element to the vehicle, and further comprising the step of articulatingly coupling the pusher elements to one another to permit the pusher elements to move relative to one another in a generally vertical plane.

26. The method of claim 24 wherein the lowering step and the raising step are each accomplished using a vertically movable member of the vehicle which engages the pusher element.

* * * * *